US007336807B2

(12) United States Patent
Tabata

(10) Patent No.: US 7,336,807 B2
(45) Date of Patent: Feb. 26, 2008

(54) DISHONEST REGISTRATION PREVENTIVE APPARATUS IN PERSONAL AUTHENTICATION SYSTEM

(75) Inventor: Naohiro Tabata, Kyoto (JP)

(73) Assignee: Omron Corporation, Kyoto-Fu (JP)

( * ) Notice: Subject to any disclaimer, the term of this patent is extended or adjusted under 35 U.S.C. 154(b) by 759 days.

(21) Appl. No.: 10/623,496

(22) Filed: Jul. 22, 2003

(65) Prior Publication Data

US 2004/0165754 A1 Aug. 26, 2004

(30) Foreign Application Priority Data

Jul. 23, 2002 (JP) .............................. 2002-214424

(51) Int. Cl.
*G06K 9/00* (2006.01)
(52) U.S. Cl. ...................... 382/118; 382/103
(58) Field of Classification Search ............... None
See application file for complete search history.

(56) References Cited

U.S. PATENT DOCUMENTS

| 6,922,478 | B1 * | 7/2005 | Konen et al. ............... 382/115 |
| 7,003,135 | B2 * | 2/2006 | Hsieh et al. ................ 382/103 |
| 7,130,446 | B2 * | 10/2006 | Rui et al. .................... 382/103 |
| 2002/0015514 | A1 * | 2/2002 | Kinjo .......................... 382/118 |

FOREIGN PATENT DOCUMENTS

| JP | 1998-232934 | 9/1998 |
| JP | 11 167632 | 6/1999 |
| JP | 2000-194855 | 7/2000 |

OTHER PUBLICATIONS

Japanese Office Action (3 pages).

* cited by examiner

*Primary Examiner*—Matthew C. Bella
*Assistant Examiner*—Alex Liew
(74) *Attorney, Agent, or Firm*—Dickstein Shapiro LLP

(57) ABSTRACT

To surely and automatically determine intermixture of images of another person without resorting to human labor and to beforehand prevent dishonest registration due to substitution, there are provided a face position detection unit for detecting a face position from images acquired by using a camera to consecutively photograph a face, a face position variation calculation unit for calculating a variation between a face position detected at this time and a face position detected at the last time, a determination unit for comparing the calculated variation of the position with a predetermined threshold to determine the image at this time as a registrable one when the variation does not amount to the threshold and to determine the image at this time as an unregistrable one when the variation exceeds the threshold, and a storage unit for registering and storing those images, which are determined to be registrable.

6 Claims, 10 Drawing Sheets

FRAME 1

FRAME 2

FRAME 3

FRAME 4

FRAME 5

DISHONEST REGISTRATION PREVENTIVE APPARATUS IN PERSONAL AUTHENTICATION SYSTEM

BACKGROUND OF THE INVENTION

1. Field of the Invention

The present invention relates to a dishonest registration preventive apparatus for preventing an image of a person other than a concerned person from being dishonestly mixed in images initially registered, in a personal authentication system for collating an image obtained in photographing a person with an image beforehand registered to authenticate the person on the basis of results of the collation.

2. Background Art

Generally known as a personal authentication system is an authentication system based on face collation and described in, for example, JP-A-11-167632. With this system, an image of a concerned person's face is photographed, its feature quantity is beforehand registered, a camera provided at an inlet is used to photograph an image of a concerned person's face at the time of entrance into a specific room to extract its feature quantity, and respective feature quantities of the photographed image and the registered image are compared with each other to discriminate between the concerned person and another person on the basis of a degree of coincidence in feature quantity. Also, with a view to performing authentication more correctly, coincidence in both a face image and an ID (identification number) is also checked by concurrently registering the ID at the time of initial registration of the face image and demanding input of the ID at the time of authentication.

In conventional personal authentication systems, however, when a face image data of another person other than a face image data of a concerned person is included for the same ID at the time of registration of the face image, it will be mistakingly determined at the time of authentication that such another person is the concerned person. Therefore, it is necessary for a supervisor to visually check whether a face image data of another person other than a concerned person is included, which causes an increase in labor cost. Also, while there is also present a method for checking a degree of similarity in a face image data having been registered and determining whether a face image data of another person is included, another person cannot be in some cases identified correctly since it is difficult to identify scatter in the face image data due to orientation of a face and changes in brightness in the case where another person is highly similar to the concerned person.

Further, while an authentication system based on face collation can be introduced into pay content services, or the like provided through a network as Internet propagates in recent years, in which case it is conceivable that in order to have an acquaintance making use of such system, a contractor intermixes a face image of another person to dishonestly register the same at the time of initial registration of a face image. So, since another person making no contract is normally authenticated as the result of collation, such another person can receive a content service or the like at no charge and so a service provider will suffer a loss. Present as a method of finding intermixture and registration of a face image of another person is a method of investigating respective degrees of similarity for registered datum, clustering degrees of similarity, and checking whether two or more clusters are present. Since degrees of similarity disperse even for a concerned person because of orientation of a face, changes in automatic exposure of a camera, or the like, and clusters are divided into sections, it is in some cases difficult to determine presence and absence of intermixture of another person's image from only datum as registered.

SUMMARY OF THE INVENTION

It is an object of the invention to solve the above-mentioned problem and to provide a dishonest registration preventive apparatus for automatically and surely determining intermixture of another person's image without resorting to human labor and beforehand preventing dishonest registration due to substitution.

In order to solve the problem, according to the invention, positions of a predetermined part (for example, a face) of a person are detected from a plurality of images acquired by consecutively photographing the predetermined part, and a variation between a position at this time and a position at the last time is calculated for a second position and subsequent positions, which are detected. And the variation calculated by the calculation means is compared with a predetermined threshold, an image at this time is determined as a registrable image when the variation does not amount to the threshold, the image at this time is determined as an unregistrable image when the variation exceeds the threshold, and images, which are determined to be registrable, are registered and stored.

Such being done, when an image of a concerned person is photographed, a face or the like is little changed in position, so that a variation is below a threshold and the photographed image is determined as an acceptable one to be registered. On the other hand, since in a process in which another person substitutes a concerned person and an image of another person is photographed, the concerned person goes out from a photographing region and another person enters the photographing region, a face or the like is much changed in position and a variation exceeds a threshold, so that the photographed image is determined to be an unregistrable one including an image of another person other than the concerned person. In this manner, whether the concerned person has been substituted by another person can be automatically and surely determined by tracking positional changes of a predetermined part of a person at the time of initial registration.

In this case, according to a preferred embodiment of the invention, when the variation is over the threshold, the image at this time is determined to be unregistrable, and those images among the plurality of images acquired by consecutive photographing, which are acquired subsequent to the image at this time having been determined to be unregistrable, are all determined to be unregistrable. Such being done, in the event of substitution of another person, not only an initial image, of which a variation is over the threshold, but also subsequently acquired images are regarded as dishonest images caused by substitution to be inhibited from registration, so that it is possible to surely prevent intermixture and registration of images of another person.

Also, the invention can adopt a system for monitoring time from detection of a position to detection of a position in place of a positional variation described above. In this case, according to the invention, positions of a predetermined part (for example, a face) of a person are detected from a plurality of images acquired by consecutively photographing the predetermined part, and an interval until a position at this time is detected after a position at the last time is detected, is measured for a second position and subsequent positions, which are detected. And an interval measured is compared with a predetermined threshold, it is determined that an image at this time is registrable when the interval does not amount to the threshold and that the image at this time is unregistrable when the interval exceeds the threshold, and images, which are determined to be registrable, are registered and stored.

Such being done, when images of a concerned person are consecutively photographed, intervals of positional detection are short and below a threshold and the photographed images are determined to be registrable to be registered. Meanwhile, in the case where a concerned person obstructs a camera with a hand to substitute another person, during which the concerned person substitutes another person, a face position or the like cannot be detected while the camera is obstructed, whereby intervals of positional detection are prolonged to be over the threshold, and so the photographed images are ones of another person who substitutes the concerned person and determined to be unregistrable. In this manner, whether the concerned person has been substituted by another person can be automatically and surely determined by monitoring intervals of positional detection of a predetermined part at the time of initial registration.

Also, in this case, according to a preferred embodiment of the invention, the image at this time is determined to be unregistrable when the interval is over the threshold, and those images among the plurality of images acquired by consecutive photographing, which are acquired subsequent to the image at this time having been determined to be unregistrable, are all determined to be unregistrable. Such being done, in the event of substitution of another person, not only an initial imager of which a variation is over the threshold, but also subsequently acquired images are regarded as dishonest images caused by substitution to be inhibited from registration, so that it is possible to surely prevent intermixture and registration of images of another person.

Further, the invention can also adopt a system of tracking variations of a position described above and a system of monitoring intervals of positional detection. In this case, variations of a face position are compared with a predetermined threshold, intervals of positional detection are compared with a predetermined threshold, an image at this time is determined to be registrable when the variations and the intervals do not amount to the thresholds, and the image at this time is determined to be unregistrable when the variations or the intervals are over the threshold.

Such being done, in the case where a concerned person substitutes another person during photographing with a camera, a face position or the like is much changed and variations are over a threshold, whereby photographed images can be determined to be unregistrable, and in the case where a concerned person substitutes another person while obstructing a camera with a hand, intervals, at which a face position or the like is detected, are prolonged to be over the threshold, and so the photographed images can be determined to be unregistrable. Accordingly, in either case, it is possible to beforehand prevent dishonest registration to enhance the accuracy of determination.

Also, in this case, according to a preferred embodiment of the invention, when a variation of a position or an interval of positional detection is over the threshold, the image at this time is determined to be unregistrable, and those images among the plurality of images acquired by consecutive photographing, which are acquired subsequent to the image at this time having been determined to be unregistrable, are all determined to be unregistrable. Such being done, in the event of substitution of another person, not only an initial image, of which a variation and an interval are over the thresholds, but also subsequently acquired images are regarded as dishonest images caused by substitution to be inhibited from registration, so that it is possible to surely prevent intermixture and registration of images of another person.

DESCRIPTION OF THE PREFERRED EMBODIMENTS

Figure 1:
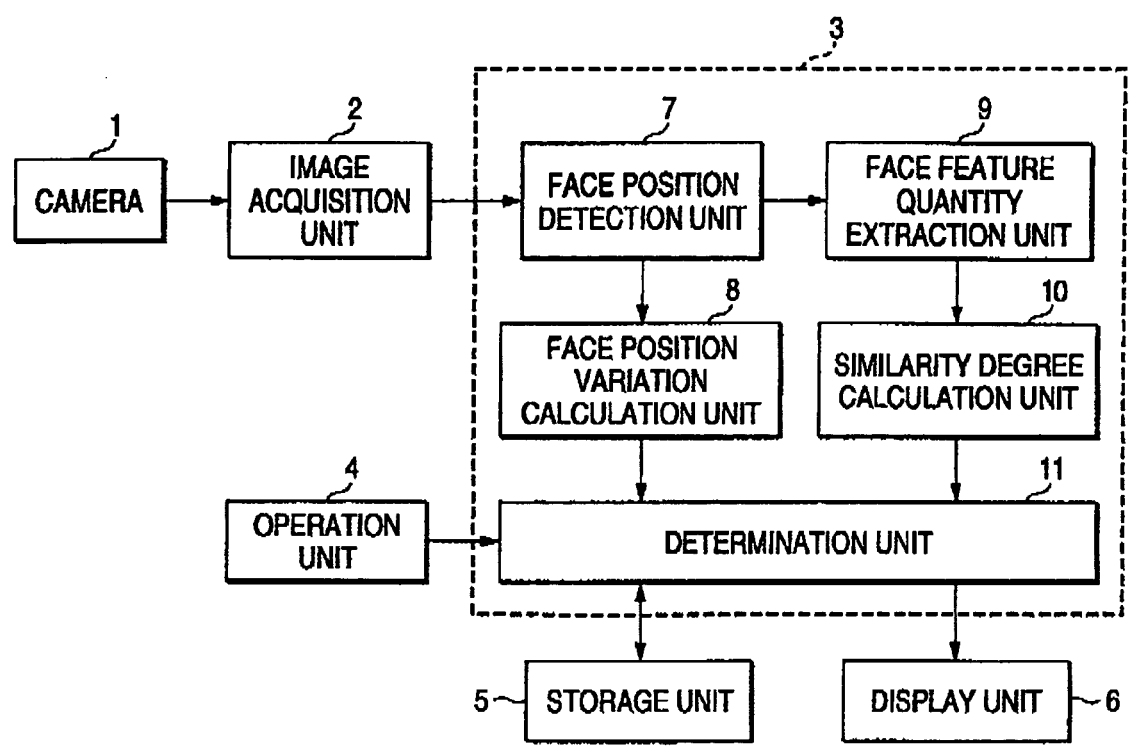
FIG. 1 is a block diagram of a personal authentication system according to a first embodiment of the invention.

FIG. 1 is a block diagram of a personal authentication system according to a first embodiment of the invention, in which substitution of a person is determined by tracking variations of a face position. The reference numeral 1 denotes a camera serving as photographing means for consecutively photographing a personal face, 2 an image acquisition unit for acquiring face images photographed by the camera 1, 3 a control unit for executing calculation and determination described later on the basis of acquired images, 4 an operation unit for inputting of a data such as ID, 5 a storage unit composed of a memory such as ROM, RAM, or the like, and 6 a display unit for displaying guidance, results of collation, and the like.

The control unit 3 comprises respective blocks 7 to 11. The reference numeral 7 denotes a face position detection unit for detecting a face position from images acquired by the image acquisition unit 2, 8 a face position variation calculation unit for calculating timewise variations of a face position detected by the face position detection unit 7, 9 a face feature quantity extraction unit for extracting face feature quantities from face images obtained by the face position detection unit 7, 10 a similarity degree calculation unit for making a comparison between face feature quantities extracted by the face feature quantity extraction unit 9 to calculate a degree of similarity and its variation, and 11 a determination unit for determining approval or denial of registration of a photographed image on the basis of results of calculation in the face position variation calculation unit 8 and the similarity degree calculation unit 10.

In the personal authentication system, the face position detection unit 7 constitutes detection means in the invention, the face position variation calculation unit 8 constitutes calculation means in the invention, the determination unit 11 constitutes determination means in the invention, and the storage unit 5 constitutes storage means. And these respective means constitute the dishonest registration preventive apparatus of the invention.

Figure 2A:
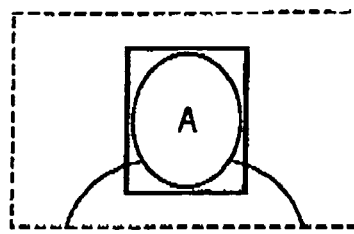
FIGS. 2(a) to 2(e) are schematic views showing a manner, in which substitution is done.
Figure 2B:
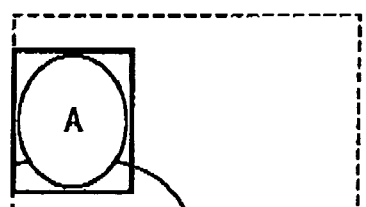
Figure 2C:
Figure 2D:
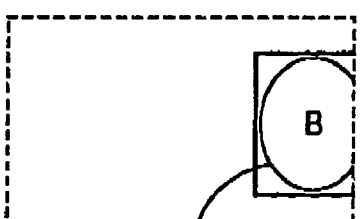
Figure 2E:
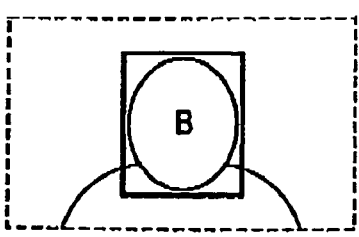

Subsequently, the principle of determining presence and absence of intermixture of face images of another person in the above system will be described with reference to FIGS. 2 to 8. FIGS. 2(a) to 2(e) are schematic views showing a manner, in which another person substitutes a concerned person. FIGS. 2(a) to 2(e) depict frames 1 to 5 photographed by the camera 1 at the time of initial registration of a face data, and thick frames in the respective frames represent face positions. Initially, a face of a concerned person A (regular contractor) is photographed substantially centrally of the frame 1 as shown in FIG. 2(a). Essentially, the face of the concerned person A is photographed to produce a plurality (for example, five) of pictures. In addition, the reason for photographing of a plurality of pictures is to accommodate scatter in expression, orientation of a face, brightness, or the like. In the case where the concerned person A substitutes another person B, however, the concerned person A moves toward one side of the frame 2 (here, leftward) as shown in FIG. 2(b), and goes out from a photographing range while another person B enters the photographing range from the other side (here, rightward) as shown in FIG. 2(c). Then, the face of the concerned person A disappears and a face of another person B appears instead as shown in FIG. 2(d), and then the face of another person B having substituted the concerned person A is photographed substantially centrally of the frame 5 as shown in FIG. 2(e).

Figure 3:
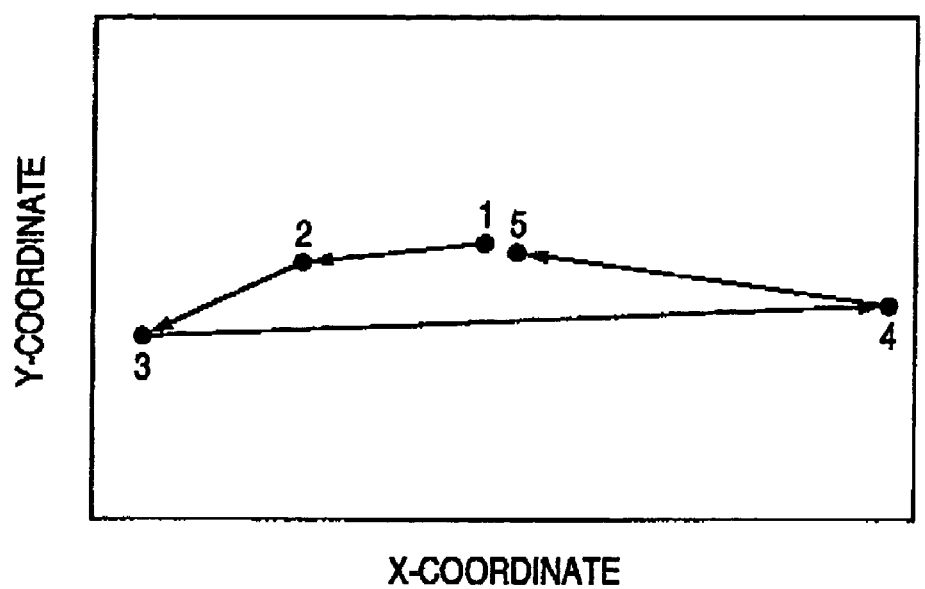
FIG. 3 is a view showing movements of a face position due to substitution.

FIG. 3 is a view showing movements of a face position in the case where the above substitution occurs. Here, a face position is represented by a X-coordinate and a Y-coordinate, and numerals (1 to 5) in the figure correspond to the respective frames (1 to 5) in FIGS. 2(a) to 2(e).

Figure 4:
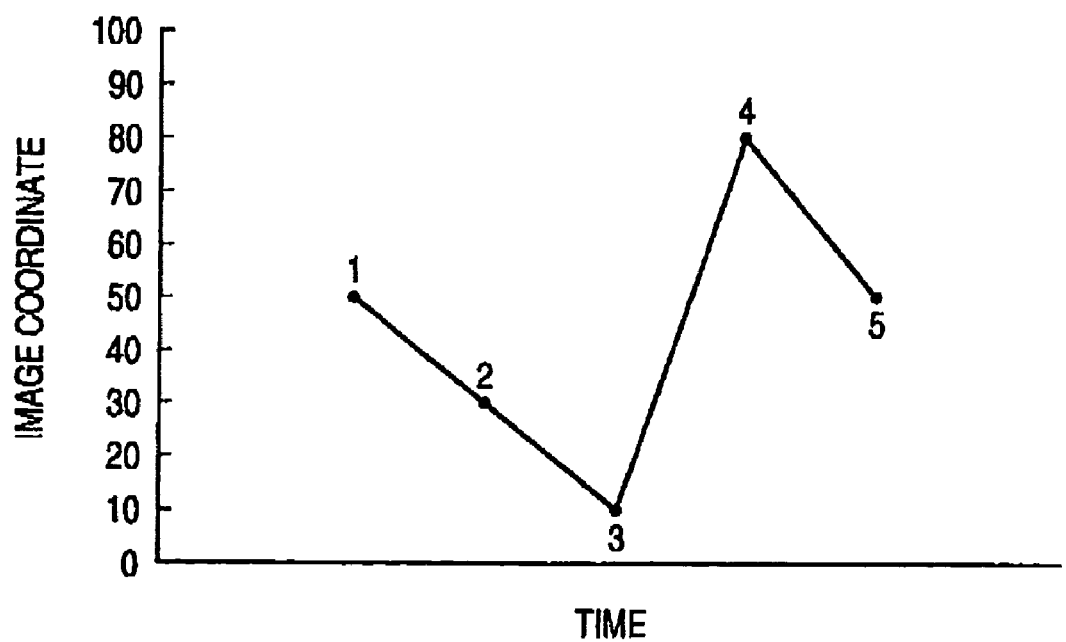
FIG. 4 is a view illustrating changes in coordinate values of a face position.

FIG. 4 is a view showing timewise variations of a X-coordinate of a face position where the axis of abscissa indicates time (frame) and the axis of ordinate indicates X-coordinate values. Here, 0 to 100 are set for X-coordinate values. In addition, numerals (1 to 5) in the figure correspond to the respective frames (1 to 5) in FIGS. 2(a) to 2(e). As seen from FIG. 4, when shifting from the frame 3 to the frame 4, a X-coordinate variation becomes extremely large as compared with X-coordinate variations between other frames, and such extreme change in X-coordinate indicates that the concerned person A has substituted another person B. Accordingly, by detecting a face position from a plurality of images obtained by consecutively photographing a face, and finding a variation between a face position at the last time and a face position at this time for a second detected position and subsequent detected positions, it is possible to determine that substitution has occurred in the case where variations are over a predetermined value.

Figure 5:
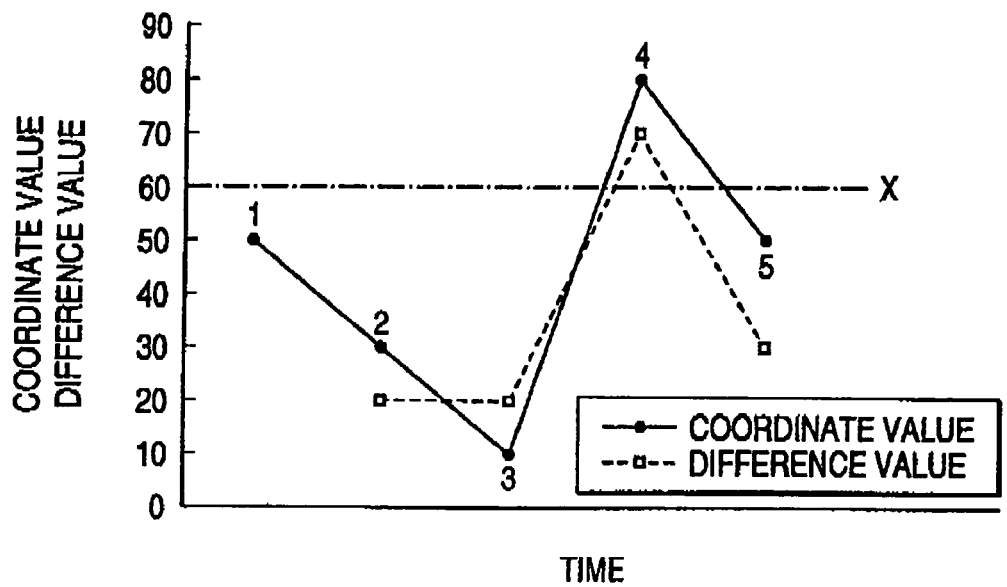
FIG. 5 is a view illustrating changes in coordinate values and difference values.

FIG. 5 is a view illustrating the principle of such determination in further detail. Here, a difference value between a coordinate of a face position at the last time and a coordinate of a face position at this time is used as a variation. Solid lines in FIG. 5 indicate timewise variations in X-coordinate shown in FIG. 4 and dotted lines indicate difference values in X-coordinate. With, for example, the frame 2, the X-coordinate at the last time (frame 1) is 50, and the X-coordinate at this time (frame 2) is 30, so that a difference value makes (50−30)=20. Also, with the frame 4, the X-coordinate at the last time (frame 3) is 10, and the X-coordinate at this time (frame 4) is 80, so that a difference value makes (80−10)=70. The difference values (variations) thus found are compared with a predetermined value of a threshold X. Here, while the value of the threshold X is exemplarily set at, for example, 60, this value can be optionally set. In the case where the threshold X is made 60, difference values except for the frame 4 are below the threshold, and only a difference value for the frame 4 is over the threshold, whereby it is determined that an image acquired in the frame 4, that is, a face image of another person B is an image having been dishonestly intermixed, and registration of such image is inhibited.

Figure 6:
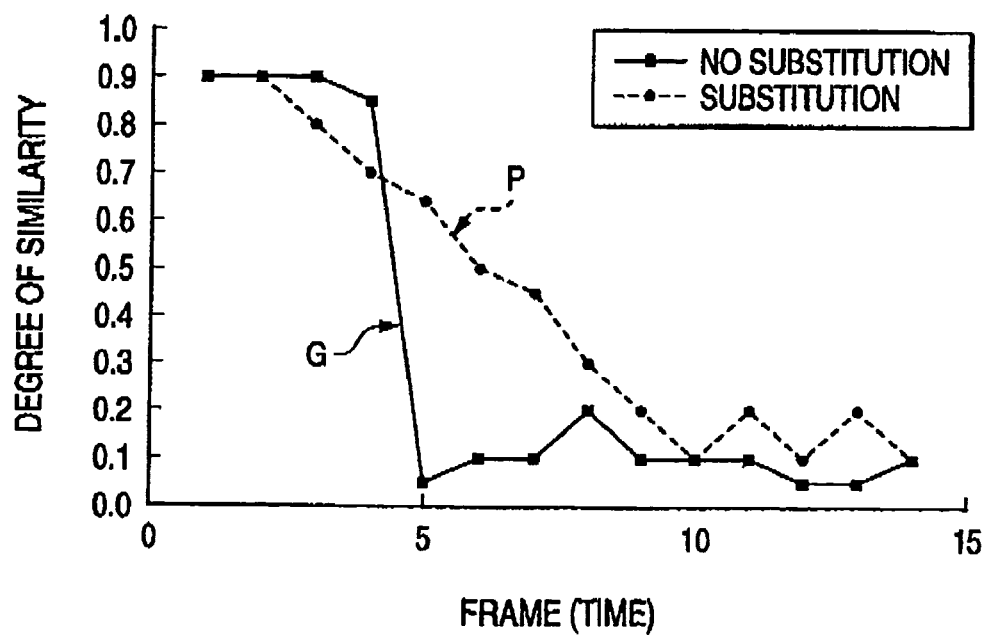
FIG. 6 is a view illustrating changes in degree of similarity.
Figure 7:
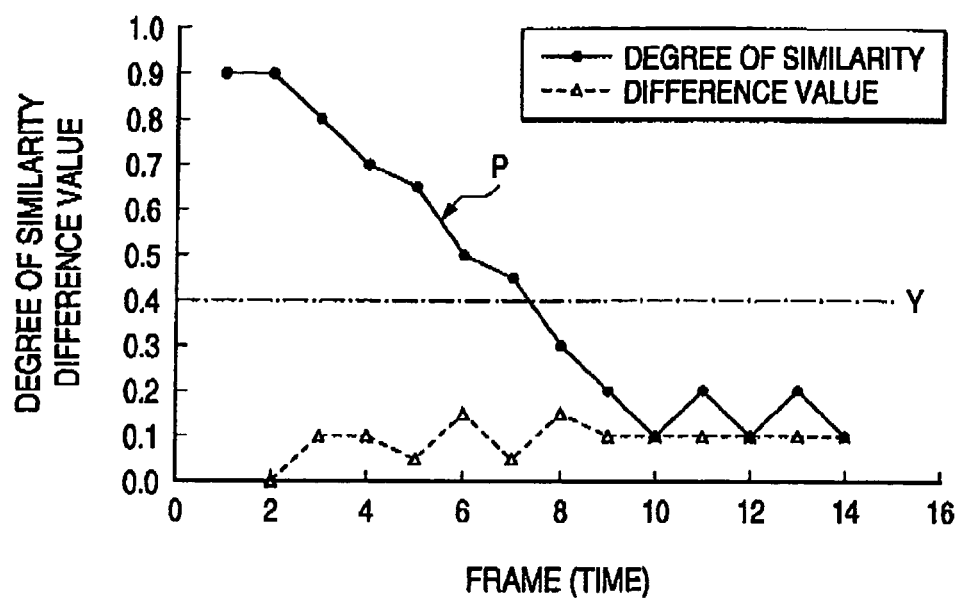
FIG. 7 is a view illustrating changes in degree of similarity and difference value in the event of no substitution.
Figure 8:
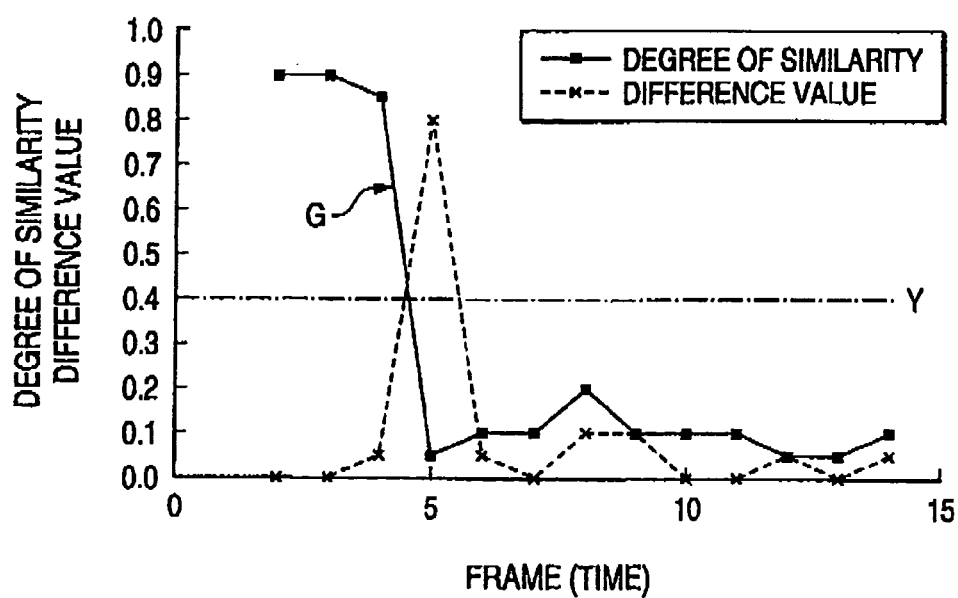
FIG. 8 is a view illustrating changes in degree of similarity and difference value in the event of substitution.

Also, in order to enhance the accuracy of determination for substitution, there can also be used in combination a system for conventionally checking changes in degree of similarity. Here, degree of similarity is a parameter obtained in comparison between feature quantities extracted from face images, and the higher coincidence of feature quantities, the higher degree of similarity. However, determination based on degree of similarity is not essential to the invention but can be omitted. FIGS. 6 to 8 are views illustrating the principle of determination of substitution on the basis of changes in degree of similarity (In addition, frames on the axis of abscissa do not correspond to the frames in FIGS. 2(a) to 2(e)). In FIG. 6, P indicates those changes in degree of similarity, which are obtained from face images (only the concerned person) in the event of no substitution, and Q indicates those changes in degree of similarity, which are obtained from face images (the concerned person and another person) in the event of substitution. As in P, the reason why the same person causes changes in degree of similarity is that orientation and expression change of a face, and automatic exposure of a camera change.

As seen from FIG. 6, face images of only the concerned person cause a slow change in degree of similarity as in P, but when substitution occurs and the concerned person's face is substituted by another person's face, degree of similarity extremely decreases as in Q since the concerned person and another person are much different in feature quantities from each other. In addition, since degree of similarity is calculated standardizing several frames (face images of the concerned person) acquired initially, degree of similarity is kept at a low value in FIG. 6 also after it decreases sharply at the time of substitution. Thus, when variations in degree of similarity are over a predetermined value, occurrence of substitution can be determined by checking changes in degree of similarity.

FIGS. 7 and 8 are views illustrating the principle of determination in further detail. Here, a difference value between degree of similarity at the last time and degree of similarity at this time is used as a variation. Solid lines in FIG. 7 indicate changes P in degree of similarity in the event of no substitution, shown in FIG. 6 and dotted lines indicate difference values in degree of similarity. With, for example, the frame 6, degree of similarity at the last time (frame 5) is 0.65, and degree of similarity at this time (frame 6) is 0.5, so that a difference value makes (0.65−0.5)=0.15. Also, with the frame 10, degree of similarity at the last time (frame 9) is 0.2, and degree of similarity at this time (frame 10) is 0.1, so that a difference value makes (0.2−0.1)=0.1. The difference values (variations) thus found are compared with a predetermined value of a threshold Y. Here, while the value of the threshold Y is exemplarily set at 0.4, this value can be optionally set. In the case where the threshold Y is made 0.4, all difference values of the respective frames are below the threshold, so that it is determined that face images in the respective frames belong to the concerned person, and photographed images are registered.

Meanwhile, solid lines in FIG. 8 indicate changes Q in degree of similarity in the event of substitution, shown in FIG. 6 and dotted lines indicate difference values in degree of similarity. With, for example, the frame 5, degree of similarity at the last time (frame 4) is 0.85, and degree of similarity at this time (frame 5) is 0.05, so that a difference value makes (0.85−0.05)=0.8. Also, with the frame 10, degree of similarity at the last time (frame 9) is 0.1, and degree of similarity at this time (frame 10) is 0.1, so that a difference value makes (0.1−0.1)=0. The difference values (variations) thus found are compared with the value of the threshold Y. In the case where the threshold Y is 0.4, difference values except for the frame 5 are below the threshold, and only a difference value for the frame 5 is over the threshold, whereby it is determined that an image acquired in the frame 5 is an image of another person having been dishonestly intermixed, and such image is inhibited from registration.

Figure 9:
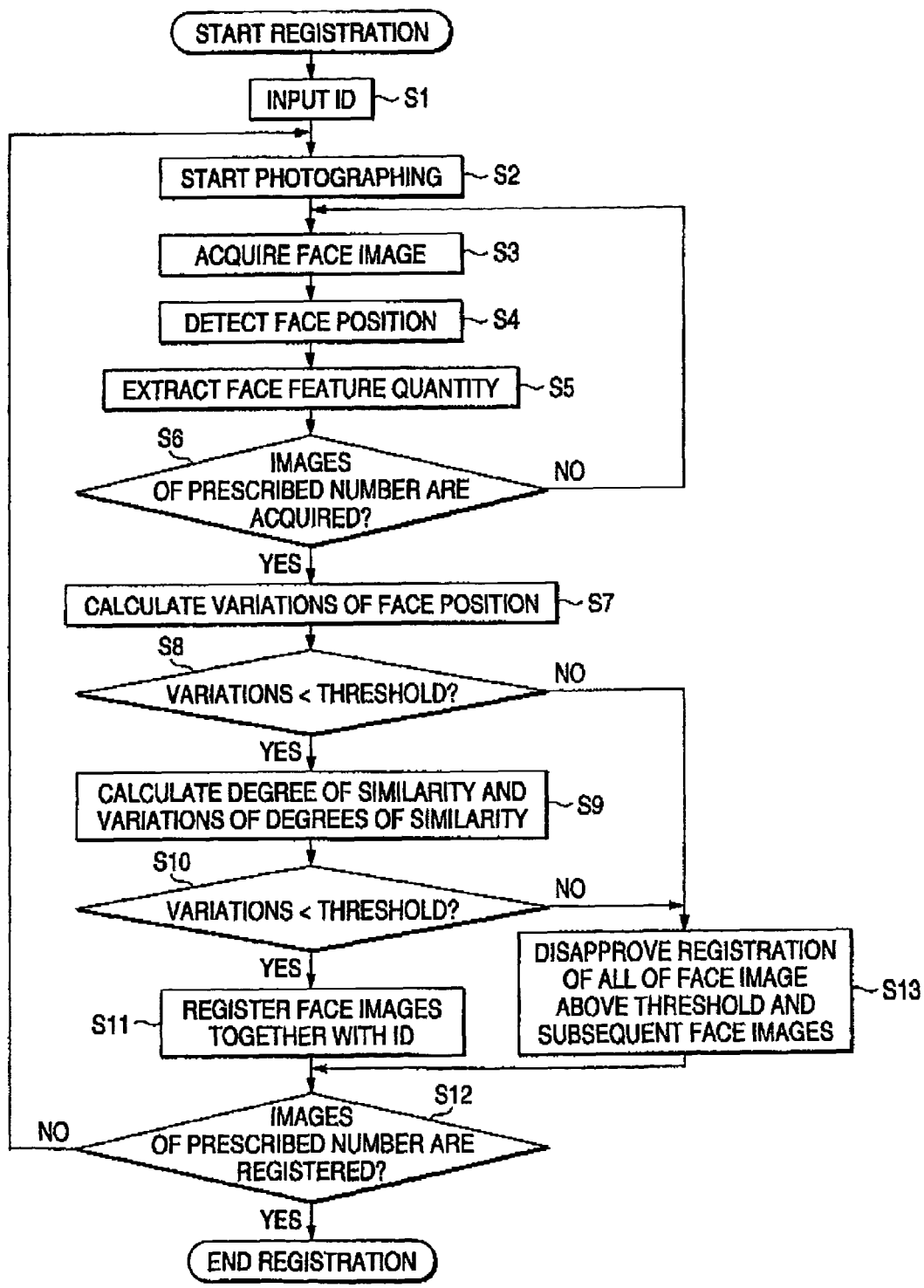
FIG. 9 is a flowchart indicating the initial registration in the first embodiment.

Subsequently, an explanation will be given to a procedure in the case where a face data is initially registered in the personal authentication system shown in FIG. 1. FIG. 9 is a flowchart indicating the procedure and showing a procedure executed by the control unit 3. In case of registration, an ID (identification number) is first input (STEP S1). Inputting of an ID is done with the use of ten keys in the operation unit 4 while an ID may be input by instead inserting a card, on which the ID has been beforehand recorded, into a card reader (not shown). When the ID is input, photographing of a face is started by the camera 1 (STEP S2), and face images are acquired in the image acquisition unit 2 (STEP S3). Subsequently, the face position detection unit 7 detects a face position on the basis of the acquired face images (STEP S4), and the face feature quantity extraction unit 9 extracts face feature quantities (STEP S5). Then, it is determined whether images of a prescribed number (for example, five) have been acquired (STEP S6), and when images do not amount to the prescribed number (STEP S6: NO), the processings in STEP S3 to STEP S6 are repeated.

When images amount to the prescribed number (STEP S6: YES), the face position variation calculation unit 8 sequentially calculates variations of a face position for a second face position and subsequent face positions, which have been detected in STEP S4 (STEP S7), and the determination unit 11 determines whether values of the variations are over the threshold X (FIG. 5) (STEP S8). When variations of a face position are below the threshold X (STEP S8: YES), the similarity degree calculation unit 10 subsequently calculates degrees of similarity on the basis of face feature quantities extracted in STEP S5 and calculates variations in degree of similarity (STEP S9), and the determination unit 11 determines whether variations in degree of similarity are over the threshold Y (FIGS. 7 and 8) (STEP 510). When variations in degree of similarity are below the threshold Y (STEP S10: YES), it is determined that all the acquired face images belong to the concerned person and can be registered, and the respective face images together with the ID input in STEP S1 are stored in the storage unit 5 to be registered (STEP S11).

Meanwhile, when variations of a face position are over the threshold X in STEP S8 (STEP S8: NO), it is determined that the face images at that time cannot be registered because they do not belong to the concerned person but are those ones of another person, which have been dishonestly intermixed, and the face images are inhibited from registration in the storage unit 5. In this case, those ones among the face images acquired in STEP S3, which have been acquired subsequent to the face image at this time, together with the face image at this time, for which variations of a face position are over the threshold X, are all inhibited from registration (STEP S13). Also, in the case where variations in degree of similarity are over the threshold Y in STEP S10 (STEP S10: NO), it is determined that the face images at that time cannot be registered because they do not belong to the concerned person but are those ones of another person, which have been dishonestly intermixed, and the face images is inhibited from registration in the storage unit 5. Also, in this case, those ones among the face images acquired in STEP S3, which have been acquired subsequent to the face image at this time, together with that face image at this time, for which variations in degree of similarity are over the threshold Y, are all inhibited from registration (STEP S13).

After the above procedure is executed, the determination unit 11 determines whether images amounting to the prescribed number (for example, five) have been registered (STEP S12). Since images acquired in STEP S3 to STEP S6 are ordinarily registered in a normal manner in the event of no substitution, a determination in STEP S12 results in YES and registration is terminated. Meanwhile, since images, of which registration is disapproved in STEP S13, are present in the event of substitution, a determination in STEP S12 results in NO, and the processing returns to STEP S2 to permit the camera 1 to photograph the concerned person again. In this case, the display unit 6 preferably displays a message, for example, "Since images photographed include images of another person, registration is not possible. Please photograph a face of a concerned person again."

When initial registration of an ID and face images is terminated in this manner, the operation unit 4 is used to input an ID and the camera 1 is used to photograph a face on the subsequent occasions, whereby the control unit 3 performs collation of the input ID with an ID registered in the storage unit 5 and collation of photographed face images with face images registered in the storage unit 5 to display results of collation on the display unit 6. And when results of collation are normal, a concerned person is authenticated, so that locking of a door is released to permit entrance into a room and pay content services are provided through a network.

According to the first embodiment described above, variations of a face position are compared with the threshold, and it is determined that images, of which variations do not amount to the threshold, are registrable ones, and images, of which variations are over the threshold, are unregistrable ones. Therefore, when another person substitutes a concerned person and tries to have a face photographed, a face image abruptly changes in position and a variation of a face position is over a threshold, whereby it is possible to automatically and surely determine substitution and to beforehand prevent dishonest registration of face images of another person. Also, since when variations of a face position are over a threshold, it is determined that all subsequent images are unregistrable, and not only an initial image in the event of substitution but also subsequent images are regarded as dishonest images caused by substitution to be inhibited from registration, so that it is possible to surely prevent intermixture and registration of images of another person. Further, while determination can be further enhanced in accuracy since variations in degree of similarity are made an element of determination in addition to the above, determination on variations in degree of similarity is not essential to the invention as described above and so may be omitted. In this case, the similarity degree calculation unit 10 shown in FIG. 1 is unnecessary, and STEP S9 and STEP S10 in FIG. 9 are also made unnecessary.

Figure 10:
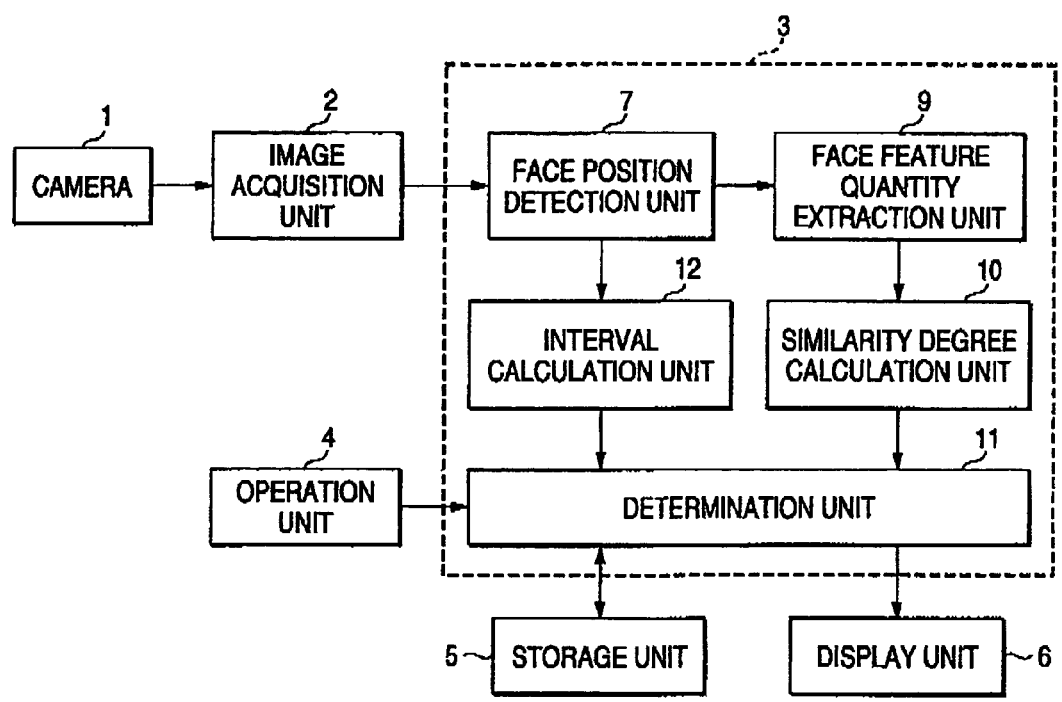
FIG. 10 is a block diagram of a personal authentication system according to a second embodiment of the invention.

FIG. 10 is a block diagram of a personal authentication system according to a second embodiment of the invention, in which substitution of a person is determined by measuring intervals, at which a face position is detected. The reference numeral 1 denotes a camera serving as photographing means for consecutively photographing a personal face, 2 an image acquisition unit for acquiring face images photographed by the camera 1, 3 a control unit for executing calculation and determination, described later, on the basis of acquired images, 4 an operation unit for inputting of a data such as ID or the like, 5 a storage unit composed of a memory such as ROM, RAM, or the like, and 6 a display unit for displaying guidance, results of collation, and the like.

In the control unit 3, the reference numeral 7 denotes a face position detection unit for detecting a face position from images acquired by the image acquisition unit 2, 12 an interval calculation unit for measuring an interval until a position at this time is detected after the face position detection unit 7 detects a position at the last time, 9 a face feature quantity extraction unit for extracting face feature quantities of a face from face images obtained by the face position detection unit 7, 10 a similarity degree calculation unit for making a comparison between face feature quantities extracted by the face feature quantity extraction unit 9 to calculate a degree of similarity and its variations, and 11 a determination unit for determining approval or denial of registration of photographed images on the basis of results of calculation in the interval calculation unit 12 and the similarity degree calculation unit 10. As apparent from a comparison between FIG. 1 and FIG. 10, the interval calculation unit 12 is provided as shown in FIG. 10 in place of the face position variation calculation unit 8 shown in FIG. 1. The remainder of the constitution is the same as that shown in FIG. 1.

In the personal authentication system constructed in the above manner, the face position detection unit 7 constitutes detection means in the invention, the interval calculation unit 12 constitutes measurement means in the invention, the determination unit 11 constitutes determination means in the invention, and the storage unit 5 constitutes storage means in the invention. And these respective means constitute the dishonest registration preventive apparatus according to the invention.

Figure 11:
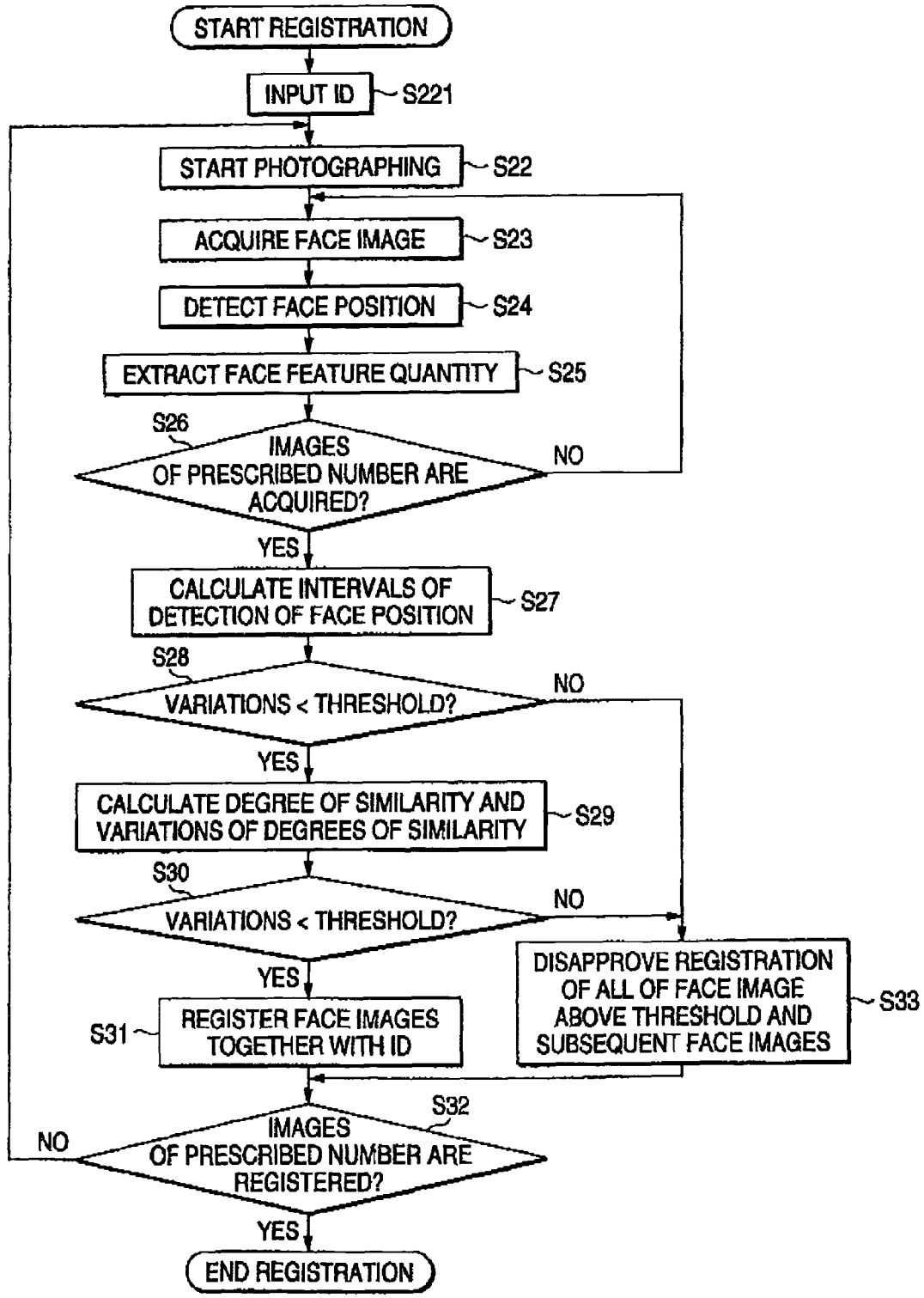
FIG. 11 is a flowchart indicating the initial registration in the second embodiment.

Subsequently, an explanation will be given to a procedure in the case where a face data is initially registered in the personal authentication system shown in FIG. 10. FIG. 11 is a flowchart indicating the procedure and showing a procedure executed by the control unit 3. In case of registration, an ID (identification number) is first input (STEP S21) Inputting of an ID is done with the use of ten keys in the operation unit 4 while an ID may be input by instead inserting a card, on which the ID has been beforehand recorded, into a card reader (not shown). When the ID is input, photographing of a face is started by the camera 1 (STEP S22), and face images are acquired in the image acquisition unit 2 (STEP S23). Subsequently, the face position detection unit 7 detects a face position on the basis of the acquired face images (STEP S24), and the face feature quantity extraction unit 9 extracts face feature quantities (STEP S25). Then, it is determined whether images of a prescribed number (for example, five) have been acquired (STEP S26), and when images do not amount to the prescribed number (STEP S26: NO), the processings in STEP S23 to STEP S26 are repeated. The above procedure is one and the same as that in STEP S1 to STEP S6 in FIG. 9.

When images amount to the prescribed number (STEP S26: YES), the interval calculation unit 12 sequentially calculates intervals when a face position is detected in STEP S24, that is, intervals until a position at this time is detected after the face position detection unit 7 detects a position at the last time, for a second position and subsequent positions (STEP S27), and the determination unit 11 determines whether the values are over a predetermined threshold (for example, three seconds) (STEP S28). When the intervals are below the threshold (STEP S28: YES), the similarity degree calculation unit 10 subsequently calculates a degree of similarity on the basis of face feature quantities extracted in STEP S25 and calculates variations in degree of similarity (STEP S29), and the determination unit 11 determines whether variations in degree of similarity are over the threshold Y (FIGS. 7 and 8) (STEP S30). When variations in degree of similarity are below the threshold Y (STEP S30: YES), it is determined that all the acquired face images belong to the concerned person and can be registered, and the respective face images together with the ID input in STEP S21 are stored in the storage unit 5 to be registered (STEP S31).

Meanwhile, when intervals of positional detection are over the threshold in STEP S28 (STEP S8: NO), it is determined that the face images at that time are unregistrable because they do not belong to the concerned person but are those ones of another person who substitutes while the camera 1 is obstructed, and the face images is inhibited from registration in the storage unit 5. In this case, those ones among the face images acquired in STEP S23, which have been acquired subsequent to the face image at this time, together with the face image at this time, for which intervals are over the threshold, are all inhibited from registration (STEP S33). Also, in the case where variations in degree of similarity are over the threshold Y in STEP S30 (STEP S30: NO), it is determined that the face images at that time are unregistrable because they do not belong to the concerned person but are those ones of another person, which have been dishonestly intermixed, and the face images are inhibited from registration in the storage unit 5. Also, in this case, those ones among the face images acquired in STEP S23, which have been acquired subsequent to the face image at this time, together with the face image at this time, for which variations in degree of similarity are over the threshold Y, are all inhibited from registration (STEP S33).

After the above procedure is executed, the determination unit 11 determines whether images amounting to the prescribed number (for example, five) have been registered (STEP S32). Since images acquired in STEP S23 to STEP S26 are ordinarily registered in a normal manner in the event of no substitution, a determination in STEP S32 results in YES and registration is terminated. Meanwhile, since images, of which registration is disapproved in STEP S33, are present in the event of substitution, a determination in STEP 32 results in NO, and the processing returns to STEP S22 to permit the camera 1 to photograph the concerned person again. In this case, the display unit 6 preferably displays a message, for example, "Since images photographed include images of another person, registration is not possible. Please photograph a face of a concerned person again."

When initial registration of an ID and face images is terminated in this manner, the operation unit 4 is used to input an ID and the camera 1 is used to photograph a face on the subsequent occasions, whereby the control unit 3 performs collation of the input ID with an ID registered in the storage unit 5 and collation of photographed face images with face images registered in the storage unit 5 to display results of collation on the display unit 6. And when results of collation are normal, a concerned person is authenticated, so that locking of a door is released to permit entrance into a room and pay content services are provided through a network.

According to the second embodiment described above, intervals of detection of a face position are compared with the threshold, and it is determined that images, for which intervals do not amount to the threshold, are registrable ones, and images, for which intervals are over the threshold, are unregistrable ones. Therefore, even when another person tries to substitute a concerned person while the camera is obstructed by a hand, a face position cannot be detected while the camera is obstructed, and so an interval from detection of a face position to another detection is prolonged to be over a threshold, whereby it is possible to automatically and surely determine substitution and to beforehand prevent dishonest registration of face images of another person. Also, since when an interval exceeds a threshold, it is determined that all subsequent images are unregistrable, not only an initial image in the event of substitution but also subsequent images are regarded as dishonest images caused by substitution to be inhibited from registration, so that it is possible to surely prevent intermixture and registration of images of another person. Further, while determination can be further enhanced in accuracy since variations in degree of similarity are made an element of determination in addition to the above, determination on variations in degree of similarity is not essential to the invention as described above and so may be omitted. In this case, the similarity degree calculation unit 10 shown in FIG. 10 is unnecessary, and STEP S29 and STEP S30 in FIG. 11 are also made unnecessary.

Figure 12:
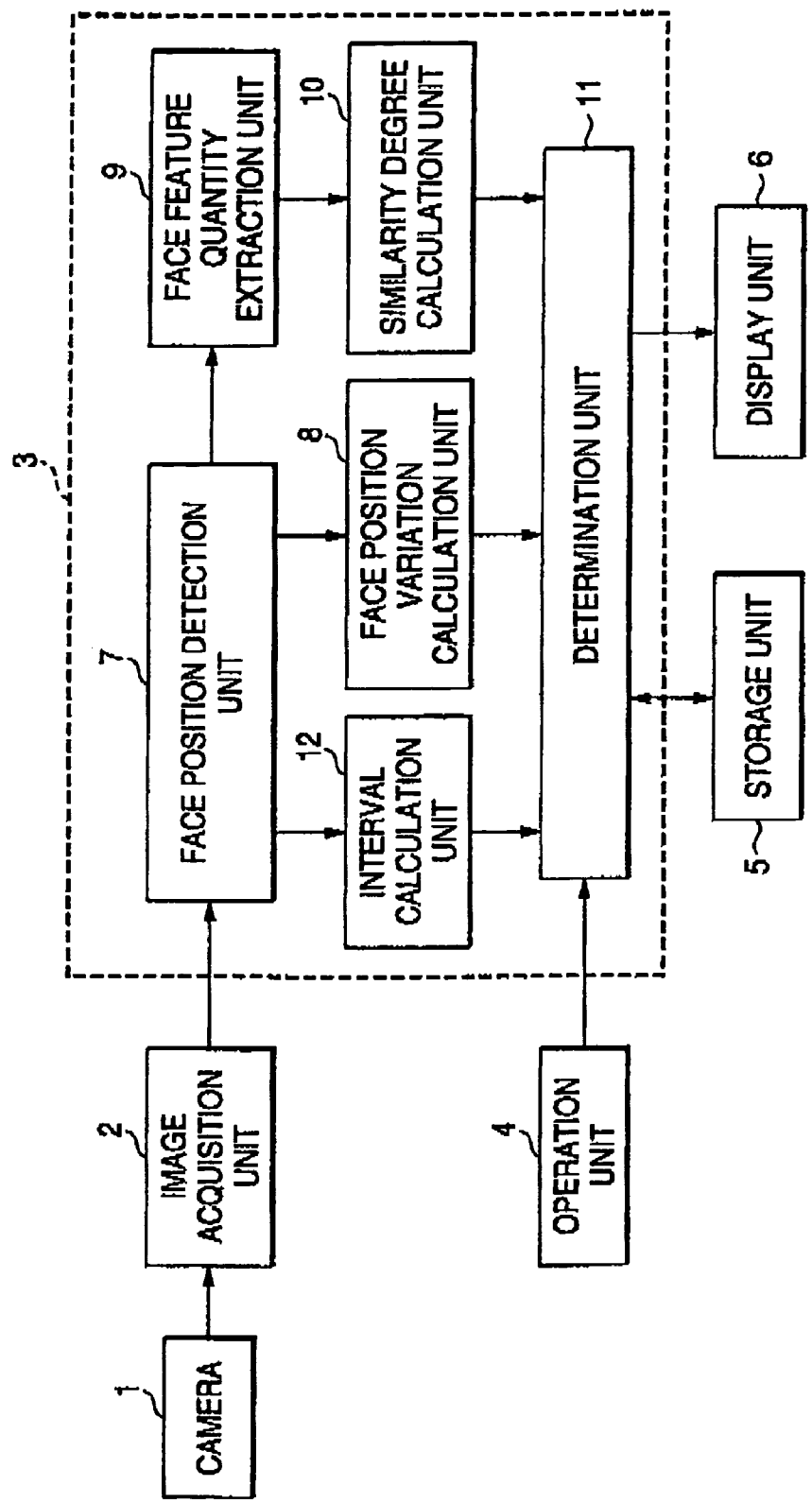
FIG. 12 is a block diagram of a personal authentication system according to a third embodiment of the invention.

FIG. 12 is a block diagram of a personal authentication system according to a third embodiment of the invention, in which a system of determining substitution on the basis of variations of a face position in FIG. 1 and a system of determining substitution on the basis of intervals of detection of a face position in FIG. 10 are used in combination. The reference numeral 1 denotes a camera serving as photographing means for consecutively photographing a personal face, 2 an image acquisition unit for acquiring face images photographed by the camera 1, 3 a control unit for executing calculation and determination, described later, on the basis of acquired images, 4 an operation unit for inputting of a data such as ID or the like, 5 a storage unit composed of a memory such as ROM, RAM, or the like, and 6 a display unit for displaying guidance, results of collation, and the like.

In the control unit 3, the reference numeral 7 denotes a face position detection unit for detecting a face position from images acquired by the image acquisition unit 2, 8 a face position variation calculation unit for calculating timewise variations of a face position detected by the face position detection unit 7, 12 an interval calculation unit for measuring an interval until a position at this time is detected after the face position detection unit 7 detects a position at the last time, 9 a face feature quantity extraction unit for extracting face feature quantities of a face from face images obtained by the face position detection unit 7, 10 a similarity degree calculation unit for making a comparison between face feature quantities extracted by the face feature quantity extraction unit 9 to calculate a degree of similarity and its variations, and 11 a determination unit for determining approval or denial of registration of photographed images on the basis of respective results of calculation in the face position variation calculation unit 8, the interval calculation unit 12 and the similarity degree calculation unit 10.

In the personal authentication system constructed in the above manner, the face position detection unit 7 constitutes detection means in the invention, the face position variation calculation unit 8 constitutes calculation means in the invention, the interval calculation unit 12 constitutes measurement means in the invention, the determination unit 11 constitutes determination means in the invention, and the storage unit 5 constitutes storage means in the invention. And these respective means constitute the dishonest registration preventive apparatus according to the invention.

Figure 13:
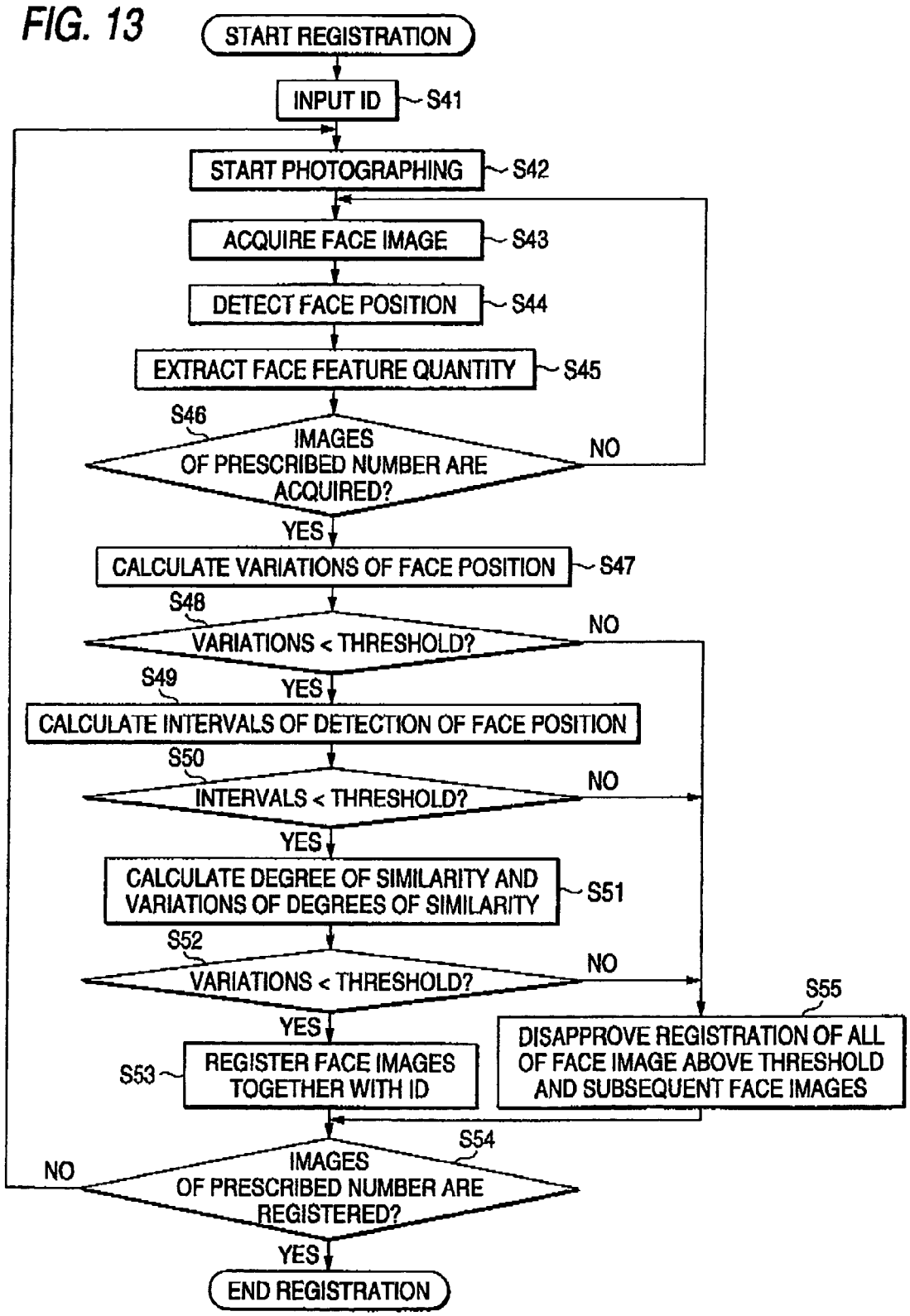
FIG. 13 is a flowchart indicating the initial registration in the third embodiment.

Subsequently, an explanation will be given to a procedure in the case where a face data is initially registered in the personal authentication system shown in FIG. 12. FIG. 13 is a flowchart indicating the procedure and showing a procedure executed by the control unit 3. In case of registration, an ID (identification number) is first input (STEP S41). Inputting of an ID is done with the use of ten keys in the operation unit 4 while an ID may be input by instead inserting a card, on which the ID has been beforehand recorded, into a card reader (not shown). When the ID is input, photographing of a face is started by the camera 1 (STEP S42), and face images are acquired in the image acquisition unit 2 (STEP S43). Subsequently, the face position detection unit 7 detects a face position on the basis of the acquired face images (STEP S44), and the face feature quantity extraction unit 9 extracts face feature quantities (STEP S45). Then, it is determined whether images of a prescribed number (for example, five) have been acquired (STEP S46), and when images do not amount to the prescribed number (STEP S46: NO), the processings in STEP S43 to STEP S46 are repeated.

When images amount to the prescribed number (STEP S46: YES), the face position variation calculation unit 8 sequentially calculates variations of a face position for a second face position and subsequent face positions, which have been detected in STEP S44 (STEP S47), and the determination unit 11 determines whether values of the variations are over the threshold X (FIG. 5) (STEP S48). When variations of a face position are below the threshold X (STEP S48: YES), the interval calculation unit 12 sequentially calculates an interval when a face position is detected in STEP S44, that is, an interval until a position at this time is detected after a position at the last time is detected, for a second position and subsequent positions, which are detected (STEP S49), and the determination unit 11 determines whether the values are over a predetermined threshold (for example, three seconds) (STEP S50). When intervals are below the threshold (STEP S50: YES), the similarity degree calculation unit 10 subsequently calculates a degree of similarity on the basis of face feature quantities extracted in STEP S45 and calculates variations in degree of similarity (STEP S51), and the determination unit 11 determines whether variations in degree of similarity are over the threshold Y (FIGS. 7 and 8) (STEP S52). When variations in degree of similarity are below the threshold Y (STEP S52: YES), it is determined that all the acquired face images belong to the concerned person and can be registered, and the respective face images together with the ID input in STEP S41 are stored in the storage unit 5 to be registered (STEP S53).

Meanwhile, when variations of a face position are over the threshold X in STEP S48 (STEP S48: NO), it is determined that face images at that time are unregistrable because they do not belong to the concerned person but are those ones of another person, which have been dishonestly intermixed, and the face images are inhibited from registration in the storage unit 5. In this case, those ones among the face images acquired in STEP S43, which have been acquired subsequent to the face image at this time, together with the face images at this time, for which variations of a face position are over the threshold X, are all inhibited from registration (STEP S55). Also, in the case where intervals of positional detection are over the threshold in STEP S50 (STEP S50: NO), it is determined that face images at that time are unregistrable because they do not belong to the concerned person but are those ones of another person who substitutes while the camera 1 is obstructed, and the face images are inhibited from registration in the storage unit 5. In this case, those ones among the face images acquired in STEP S43, which have been acquired subsequent to the face image at this time, together with the face image at this time, for which intervals are over the threshold, are all inhibited from registration (STEP S55). Further, in the case where variations in degree of similarity are over the threshold Y in STEP S52 (STEP S52: NO), it is determined that face images at that time are unregistrable because they do not belong to the concerned person but are those ones of another person, which have been dishonestly intermixed, and the face images are inhibited from registration in the storage unit 5. Also, in this case, those ones among the face images acquired in STEP S43, which have been acquired subsequent to the face image at this time, together with the face image at this time, for which variations in degree of similarity are over the threshold Y, are all inhibited from registration (STEP S55).

After the above procedure is executed, the determination unit 11 determines whether images amounting to the prescribed number (for example, five) have been registered (STEP S54). Since images acquired in STEP S43 to STEP S46 are ordinarily registered in a normal manner in the event of no substitution, a determination in STEP S54 results in YES and registration is terminated. Meanwhile, since images, of which registration is disapproved in STEP S55, are present in the event of substitution, a determination in STEP S54 results in NO, and the processing returns to STEP S42 to permit the camera 1 to photograph the concerned person again. In this case, the display unit 6 preferably displays a message, for example, "Since images photographed include images of another person, registration is not possible. Please photograph a face of a concerned person again."

When initial registration of an ID and face images is terminated in this manner, the operation unit 4 is used to input an ID and the camera 1 is used to photograph a face on the subsequent occasions, whereby the control unit 3 performs collation of the input ID with an ID registered in the storage unit 5 and collation of photographed face images with face images registered in the storage unit 5 to display results of collation on the display unit 6. And when results of collation are normal, a concerned person is authenticated, so that locking of a door is released to permit entrance into a room and pay content services are provided through a network.

According to the third embodiment described above, substitution is determined on the basis of variations of a face position and intervals of detection of a face position. With the system of using variations of a face position as in the first embodiment, when substitution occurs between a concerned person and another person while the camera is obstructed, it can happen that such substitution cannot be discovered because a face position is little changed before and after the camera is obstructed. Meanwhile, with the system of using intervals of detection of a face position as in the second embodiment, when substitution quickly occurs between a concerned person and another person in a state, in which the camera is not obstructed, it can happen that intervals of detection of a face position do not exceed the threshold and so such substitution cannot be discovered.

According to the third embodiment, the use of the both systems in common makes it possible to automatically and surely determine substitution even when either dishonest act is done, thus enabling enhancing the accuracy. Also, according to the third embodiment, since when variations of a face position and intervals of positional detection are over the thresholds, it is determined that all subsequent images are unregistrable, so that not only an initial image in the event of substitution but also the subsequent images are regarded as dishonest images caused by substitution to be inhibited from registration, thus enabling surely preventing intermixture and registration of images of another person. Further, while determination can be further enhanced in accuracy since variations of degrees of similarity are made an element of determination in addition to the above, determination on variations of degrees of similarity is not essential to the invention and so may be omitted. In this case, the similarity degree calculation unit 10 shown in FIG. 12 is unnecessary, and STEP S51 and STEP S52 in FIG. 13 are also made unnecessary.

While an example, in which the camera 1 is provided in a personal authentication system, is illustrated in the respective embodiments, the invention is not limited thereto but face images may be taken in by storing a data of those face images, which have been photographed by a separate camera in a separate place, in a recording medium, and mounting the recording medium on a medium reading device (not shown) provided in a personal authentication system. Alternatively, a personal authentication system may have the function of communication to be able to receive photographed face images via communication lines by radio waves or cable.

Also, while the case of photographing face images is exemplarily referred to in the respective embodiments described above, the invention is not limited thereto but, for example, an iris other than a face can be used as a part being photographed.

According to the invention, changes in position of a predetermined part and intervals of positional detection are compared with thresholds, whereby it is possible to surely and automatically determine intermixture of images of another person without resorting to human labor and to beforehand prevent dishonest registration due to substitution.

What is claimed is:

1. A dishonest registration preventive apparatus in a personal authentication system, which collates an image obtained by photographing a person with a beforehand registered image to authenticate the person on the basis of results of the collation, the apparatus comprising:
   detection means for detecting positions of the person from a plurality of images acquired by consecutively photographing the person,
   calculation means for calculating a variation between a position of the person at a current time and a position of the person at a previous time, which are detected by the detection means,
   feature extraction means for extracting face feature quantities from images of the plurality of images, similarity calculation means for determining a degree of similarity of face feature quantities extracted from an image of the person taken at a current time with face feature quantities extracted from an image of the person taken at a previous time, determination means for comparing the variation calculated by the calculation means with a first predetermined threshold and comparing the degree of similarity to a second predetermined threshold to determine that an image of the plurality of images is a registrable image when the variation does not amount to the first threshold and the degree of similarity is greater than the second threshold and to determine that the image of the plurality of images is an unregistrable image when the variation exceeds the first threshold or the degree of similarity does not exceed the second threshold, and storage means for registering and storing images, which are determined by the determination means to be registrable.

2. The dishonest registration preventive apparatus according to claim 1, wherein the determination means determines the image of the plurality of images to be unregistrable when the variation calculated by the calculation means is over the first threshold or the degree of similarity is not over the second threshold, and determines that those images among the plurality of images, which are acquired subsequent to the image of the plurality of images having been determined to be unregistrable, are all unregistrable.

3. A dishonest registration preventive apparatus in a personal authentication system, which collates an image obtained by photographing a person with a beforehand registered image to authenticate the person on the basis of results of the collation, the apparatus comprising:

detection means for detecting positions of the person from a plurality of images acquired by consecutively photographing the person, measurement means for measuring an interval until a position at a current time is detected after a position at a previous time is detected, which are detected by the detection means, feature extraction means for extracting face feature quantities from images of the plurality of images, similarity calculation means for determining a degree of similarity of face feature quantities extracted from an image of the person taken at a current time with face feature quantities extracted from an image of the person taken at a previous time, determination means for comparing the interval measured by the measurement means with a first predetermined threshold and comparing the degree of similarity to a second predetermined threshold to determine that a current image is a registrable image when the interval does not amount to the first threshold and the degree of similarity is greater than the second threshold and to determine that the current image is an unregistrable image when the interval exceeds the first threshold or the degree of similarity does not exceed the second threshold, and storage means for registering and storing images, which are determined by the determination means to be registrable.

4. The dishonest registration preventive apparatus according to claim 3, wherein the determination means determines the current image to be unregistrable when the interval measured by the measurement means is over the first threshold or the degree of similarity is not over the second threshold, and determines that those images among the plurality of images, which are acquired subsequent to the current image having been determined to be unregistrable, are all unregistrable.

5. A dishonest registration preventive apparatus in a personal authentication system, which collates an image obtained by photographing a person with a beforehand registered image to authenticate the person on the basis of results of the collation, the apparatus comprising:

detection means for detecting positions of a predetermined part of the person from a plurality of images acquired by consecutively photographing the predetermined part, calculation means for calculating a variation between a position at this time and a position at a previous time, which are detected by the detection means, measurement means for measuring an interval until a position at this time is detected after a position at the last time is detected, which are detected by the detection means, feature extraction means for extracting face feature quantities from images of the plurality of images, similarity calculation means for determining a degree of similarity of face feature quantities extracted from an image of the person taken at a current time with face feature quantities extracted from an image of the person taken at a previous time, determination means for comparing the variation calculated by the calculation means with a first predetermined threshold, comparing the interval measured by the measurement means with a second predetermined threshold, and comparing the degree of similarity to a third predetermined threshold to determine an image at this time as a registrable image when the variation and the interval do not amount to the respective first and second thresholds and the degree of similarity is greater than the third threshold and to determine the image at this time as an unregistrable image when the variation or the interval is over the respective first or second threshold or the degree of similarity is not over the third threshold, and storage means for registering and storing images, which are determined by the determination means to be registrable.

6. The dishonest registration preventive apparatus according to claim 5, wherein the determination means determines the image at this time to be unregistrable when the variation or the interval is over the respective first or second threshold or the degree of similarity is not over the third threshold and determines that those images among the plurality of images, which are acquired subsequent to the image at this time having been determined to be unregistrable, are all unregistrable.

* * * * *